E. J. MOORE.
COMBINATION VALVE AND METER.
APPLICATION FILED AUG. 5, 1907.

958,664.

Patented May 17, 1910.
2 SHEETS—SHEET 1.

ATTEST
E. W. Fisher
J. C. Nussum

INVENTOR
Edward J. Moore.
BY Fisher & Moser ATTYS

E. J. MOORE.
COMBINATION VALVE AND METER.
APPLICATION FILED AUG. 5, 1907.
958,664.
Patented May 17, 1910.
2 SHEETS—SHEET 2.
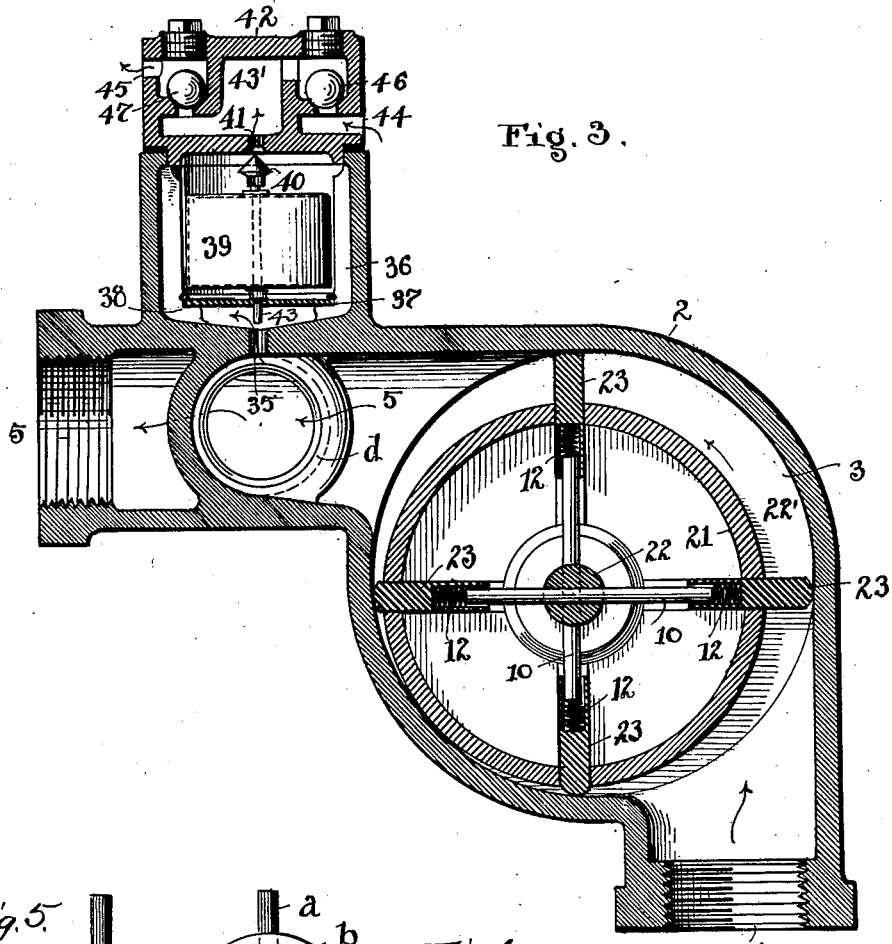
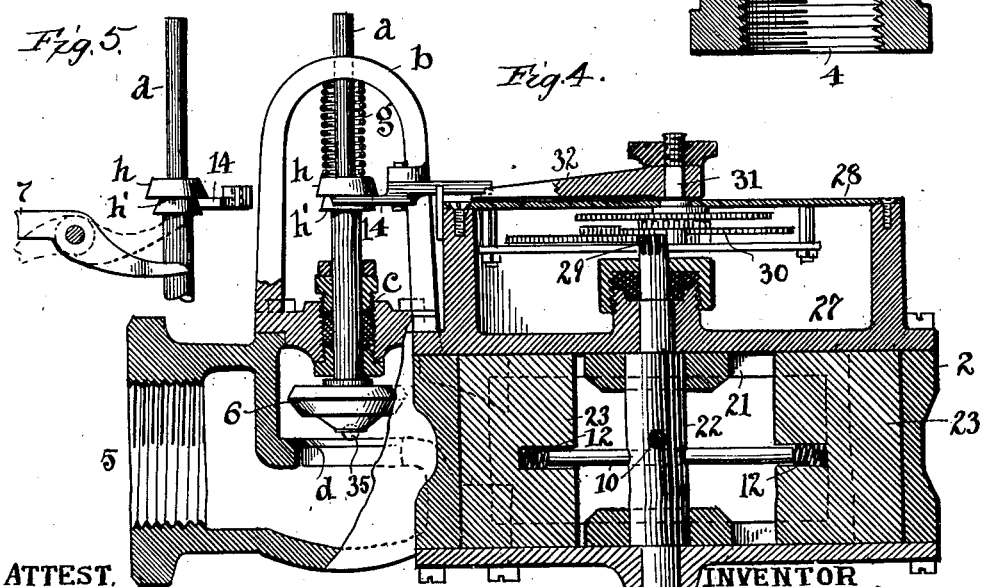
ATTEST.
E. M. Fisher
J. C. Mussun
INVENTOR
Edward J. Moore.
BY Fisher & Moore ATTYS.

UNITED STATES PATENT OFFICE.

EDWARD J. MOORE, OF CLEVELAND, OHIO.

COMBINATION VALVE AND METER.

958,664. Specification of Letters Patent. Patented May 17, 1910.

Application filed August 5, 1907. Serial No. 387,035.

*To all whom it may concern:*

Be it known that I, EDWARD J. MOORE, a citizen of the United States, residing at Cleveland, in the county of Cuyahoga and State of Ohio, have invented certain new and useful Improvements in Combination Valves and Meters, and do declare that the following is a full, clear, and exact description of the invention, which will enable others skilled in the art to which it appertains to make and use the same.

My invention relates to a combination valve and meter adapted to be used in connection with liquid supply systems having drainage facilities, all as herein shown and described and more particularly pointed out in the claims.

One of the objects of the invention is to provide a meter adapted to be set for a predetermined movement according to amount of liquid to be passed in a single measurement and which combines with valve mechanism to automatically shut off the supply of liquid when a predetermined amount has passed through the meter and to stop operation.

Another object of the invention is to provide the meter with construction and means adapted to perfectly drain the meter of its contents whenever this may be desired, and also whereby complete preliminary filling of the device and line may be obtained by exhausting the air from the meter when filling occurs.

This invention is an improvement on my application, Ser. No. 353,541.

Figure 1:
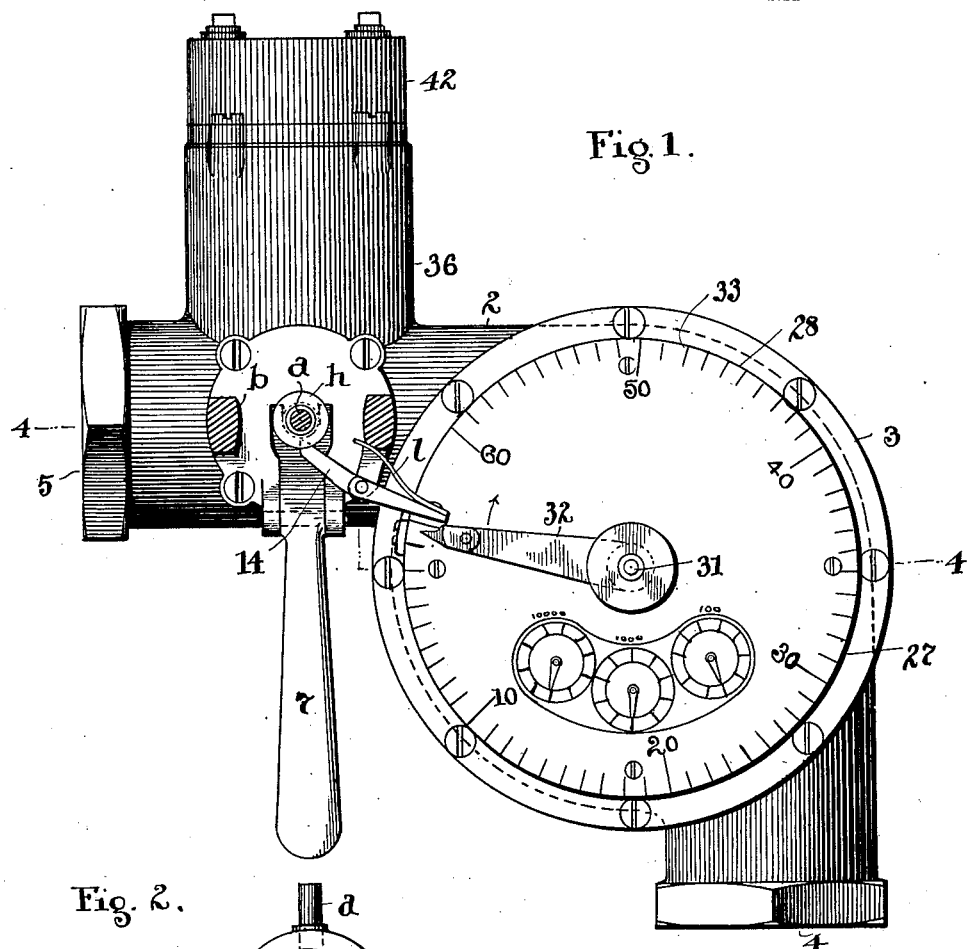
Figure 2:
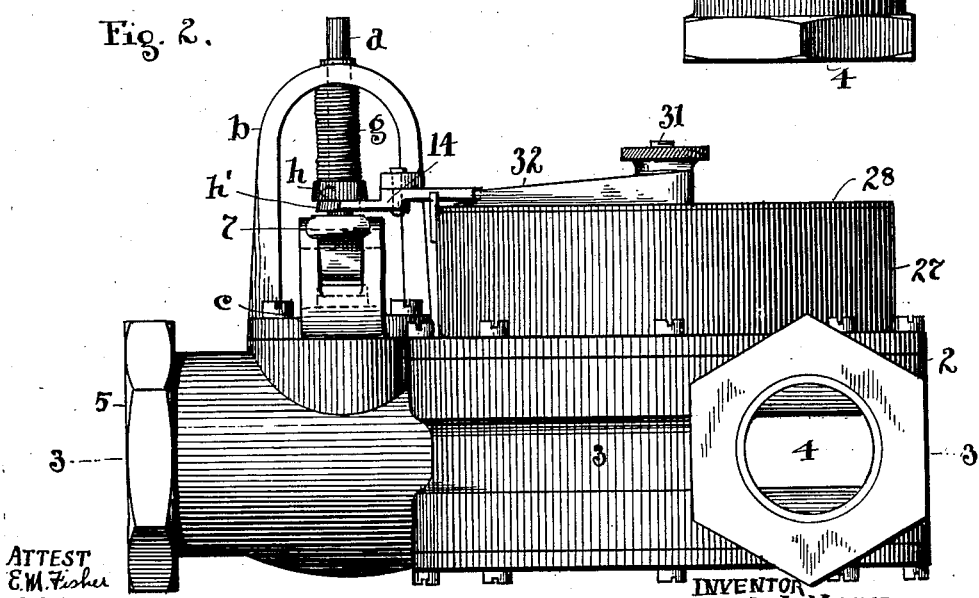

In the accompanying drawings, Figure 1 is a side elevation of the meter partly in section and Fig. 2 is a bottom plan view thereof. Fig. 3 is a vertical sectional elevation on line 3—3, Fig. 2, and Fig. 4 is a horizontal sectional plan view corresponding substantially to line 4—4, Fig. 1. Fig. 5 is an elevation of the upper portion of the valve spindle and showing the valve operating hand lever and rocker arm in that connection.

As thus shown, the invention comprises a casing 2 compassing all the operating parts and features and provided with a circular meter chamber having inlet opening 4 for liquid supply connection and outlet 5 at the opposite side and through which the measured liquid is discharged. The said discharge or passage involves a valve mechanism of some sufficient kind, which is adapted to be automatically closed as each measured or metered quantity has been passed through, and to be opened when another measurement is to be discharged. The latter is by hand lever 7 in this instance. This involves one point of departure from my former construction, in which I employed a plug valve. Experience has shown that such a valve is liable to become sticky and hard to operate and hence more or less unreliable in its operations, which of course cannot be allowed when exact and uniform measurement is demanded. Hence I have discarded the plug valve and adopted a puppet valve 6 instead, arranged with its spindle $a$ in a suitable bearing yoke $b$ above and packed bearing $c$ below and adapted to close on seat $d$. A spring $g$ pressing on collar $h$ on said spindle inside bearing $b$ serves to drive said valve to its seat when released by the setting and tripping mechanism including rocker arm 14, adapted to engage beneath beveled collar $h$ and hold the valve from its seat. Arm 14 is pivoted at its center on an elbow on yoke $b$ and has a spring 1, Fig. 1, to keep it normally in position to engage beneath collar $h$ when the valve is raised. Another or sub-collar portion $h'$ beneath or within collar $h$ proper, serves as a point of engagement for valve operating hand lever 7, by which the valve is raised or moved off its seat and "set." Then arm 14 springs into engagement and holds the valve open until it is automatically released by arm 32 and closed by spring $g$ aided by the pressure of liquid.

The meter or measuring portion of the apparatus comprises a rotatable drum 21 of less cross section than circular chamber 3 relatively as shown and mounted on shaft 22 eccentrically in said chamber and adapted to run in close and practically liquid sealed contact with a portion of the wall of said chamber on one side and apart from such wall on the other to afford a liquid passage 22′. Said shaft and drum rotate together, and the shaft has bearings in the wall of the main casing and extends through one side thereof on the exposed end of which there are gear teeth 29. A series of vanes or blades 23 are slidably mounted in slots and channels radially disposed in drum 21, which slots and guides have a depth equal to the depth of said blades, so that the blades disappear therein on the sealed side of the drum and are out in full working depth in all the other portions and according to their position in the chamber 2. Said blades or vanes are held to an annular orbit by centrally located cross rods 10 slidably mounted in shaft 22 in drum 21, thus projecting one or more of said blades at all times into the path of the liquid about drum 21, as shown. Now, this involves another material improvement over my former construction in that said structure was liable to be leaky and in certain positions of the parts would pass the liquid through without measuring. Apparently, one of the difficulties lies in the positive relations of the blades to their bearings and the incidental wear at their edges which allowed liquid to escape without means of taking up the wear. Hence for this reason, and to cut off all other lines of escape, I have projected cross rods through shaft 22 and set springs 12 in sockets in blades 23 to engage the ends of said rods or arms 10, and by which means the blades yield inward to spring pressure and are held out to work by said springs.

At one side of the measuring chamber in the main casing is a gear chamber, 27, which is closed to the measuring chamber and has a dial plate 28 on its outer side, removably secured to casing 2. The gear end 29 of main shaft 22 is in this chamber and in driving relation to or with what may be termed a clock mechanism generally indicated by 30 and in driving relation with shaft 31 carrying dial hand 32. The outer end of said hand 32 is in operating engaging relation with arm 14 which holds valve 6 open and is adapted to trip said arm and let the valve close when a certain predetermined quantity of liquid has been discharged, according to the adjustments made by hand 32. When a given amount to which the machine is set has been measured out by the meter the valve 6 will be automatically closed and will remain closed until opened again by hand lever 7.

Now referring to the air intake and exhaust mechanism forming a part of this device, it will be noted that the same is in open communication with discharge passage 5 at an intermediate point between valve 6 and meter drum 21 as indicated by opening 35, which communicates with float chamber 36 in casing 2. A false bottom 37 in said chamber 36 rests on ribs 38 shouldered at the bottom of the chamber and which ribs also serve as guides for float body 39. Said body carries a cone shaped valve head 40 adapted to seat within and thereby close air passage 41 in the bottom wall of valve box 42. A central downwardly extending pin 43 rigid with float body 39 also acts as a guide therefor because of its slidable relation with a central opening in false bottom 37. Box or cover 42 has a central air chamber 43' with which air passage 41 connects, and communication with the outer atmosphere is had from chamber 43' through separate intake and exhaust openings 44 and 45 controlled by ball check valves 46 and 47, respectively.

The advantage of the foregoing arrangement is better understood when the operation of the whole device is considered in connection with a system for delivering liquids from a given source of supply and under pressure, such as air pressure, upon the liquid in the line of supply connections. Thus, upon initial filling of the supply pipes and to provide for the complete filling of the device so that the meter will correctly measure the liquid flow from the beginning, it is essential that all air in the device be forced out of the line and the meter filled with liquid up to valve 6. As the liquid in the line advances under its head of pressure, the trapped air within the line is forced out through the device, drum 21 being rotated thereby and the air escaping through openings 35 and 45, past ball valve 47. When the head of the liquid reaches float chamber 36, float body 39 is raised thereby and its valve 40 closes opening 41 and the same remains closed thereafter as long as pressure is upon the line. The device is now ready for the measured withdrawal of liquid, and, to obtain a predetermined supply thereof, dial hand 32 is set at any given point and valve 6 opened. The flow of liquid through the meter returns hand dial 32 to zero point, engages trip member 14 and valve 6 closes automatically. This operation may be repeated indefinitely and when the plant is shut down for any reason the liquid is withdrawn entirely from the line, but the flow is reversed for this operation by relieving the pressure upon the line and draining back into the storage receptacle from which it was originally forced. In this drainage operation, the column of liquid within the line exerts a pull upon drum 21 and reverses the usual order of its rotation, and this must occur because of the vacuum formed within the pipe upon the withdrawal of the liquid and which is not offset until all the liquid within the meter and float valve chamber 36 is also withdrawn and air admitted to the line through openings 44, 41 and 35 and through the meter. Practically no liquid is thus left in the valve connections or line to endanger the plant in the event of fire, and the ball check-valves 46 and 47 effectively seal all air inlets and outlets to the line at this time, so that no vapors may escape nor any clinging liquids may gum or harden within the device and impede its operation upon starting.

What I claim is:—

1. A meter provided with a measuring space provided with a discharge and a self seating valve in said discharge and a rotary measuring device within said space having oppositely connected spring pressed blades, in combination with air inlet and outlet openings for said measuring space and separate valves for said openings adapted to automatically open and close according as pressure or suction is on the meter, and a main valve to control the flow of air.

2. A meter and a spring pressed puppet valve therefor and an air valve arranged between said meter and valve and constructed to automatically open and close upon the operation of the meter, in combination with mechanism adapted to set said meter for the withdrawal of predetermined amounts of liquid, and trip means operated thereby to release said valve when the predetermined amount is withdrawn.

3. The combination of the casing and the main valve in the outlet therefrom, a stem on said valve having a beveled collar, a drum and slidable blades therein engaged with said casing and a shaft carrying said drum, in combination with means to stop the rotation of the drum at predetermined times comprising an arm to engage said collar and to hold said valve open, and a dial hand operated from one end of said shaft adapted to release said arm.

4. In a liquid measuring meter, a measuring mechanism and a self closing puppet valve in the discharge therefrom and a trip member to hold said valve open, in combination with a float case and a float and a main air valve therein adapted to control the flow of air in both directions for the purposes set forth.

In testimony whereof I sign this specification in the presence of two witnesses.

EDWARD J. MOORE.

Witnesses:
R. B. MOSER,
F. C. MUSSUN.